POSITIVE SEATING REEL LATCHING APPARATUS

Original Filed Oct. 29, 1969

3 Sheets-Sheet 1

INVENTOR
THOMAS E. MALLETTE
BY
John E. Lecky
ATTORNEY

POSITIVE SEATING REEL LATCHING APPARATUS

Original Filed Oct. 29, 1969 3 Sheets-Sheet 2

United States Patent Office

Re. 28,296
Reissued Jan. 7, 1975

28,296
POSITIVE SEATING REEL LATCHING APPARATUS

Thomas E. Mallette, Broomfield, Colo., assignor to International Business Machines Corporation, Armonk, N.Y.

Original No. 3,532,286, dated Oct. 6, 1970, Ser. No. 771,597, Oct. 29, 1968. Application for reissue Oct. 11, 1973, Ser. No. 405,602
Int. Cl. B65h *17/02*
U.S. Cl. 242—68.3 15 Claims

Matter enclosed in heavy brackets [ ] appears in the original patent but forms no part of this reissue specification; matter printed in italics indicates the additions made by reissue.

ABSTRACT OF THE DISCLOSURE

The invention is directed to reel latching apparatus of the type having an expansion ring on the reel hub which is radially expanded into latching engagement with a tape reel under the control of a shiftable cam. Preliminary to radial expansion of the ring, a plurality of cooperating reel positioning members are simultaneously urged in an outward radial and axial direction against the reel in order to positively seat and position the reel on the reel hub in alignment over the ring. Locating pins prevent movement of the cam if the reel is not first properly seated on the reel hub.

This invention relates to novel and improved reel latching apparatus and more particularly to devices for releasably positioning and latching magnetic tape reels and tape cartridges on a drive shaft.

In magnetic tape transport assemblies, it is customary practice to position the tape reel on a latching apparatus secured to the drive shaft and to establish positive but releasable engagement between the tape reel and apparatus by means of an expanding mandrel or ring, for example, in the manner shown in the patent to Frederick B. Froehlich, No. 3,278,133, entitled "Tape Reel Latch," and assigned to the assignee of the present invention. In latching the tape reel on the drive shaft it is important that exact alignment be established between the tape reel and drive shaft in order to assure accurate feeding or threading of the tape across the transducer element for reading and writing information on the tape. This is especially true in the tape transports of the type set forth and described in the patent to A. W. Orlando et al., No. 3,371,882, entitled "Toggle Latching Reel Cover With a Sliding Door," and assigned to the assignee of the present invention, wherein the tape cartridge is left on the reel and the tape is fed automatically through a limited opening in the side wall of the cartridge. When placed on the drive shaft, interference-free alignment of the reel within the cartridge dictates the necessity of reliable axial positioning of the tape reel with respect to the drive shaft.

While it is generally known to latch a tape reel both against axial movement as well as against rotational slippage with respect to the drive shaft, typically this has been accomplished in the past by advancing a plurality of elements simultaneously into engagement with limited surface portions of the reel. It is now proposed in accordance with the present invention to position and seat the reel in predetermined relation to the drive shaft and thereafter to latch the reel for nonslipping rotation by the drive shaft, and in such a way that the operation can be carried out sequentially in response to movement of a common actuating member. This makes possible the use of a separate latching member which is capable of establishing firm frictional engagement with substantially the entire inner surface of the reel and therefore permits full utilization of the advantages and principles of latching mechanisms of the type set forth and described in the aforesaid patent to Froehlich, No. 3,278,133.

It is therefore an object of the present invention to provide a novel and improved reel latching apparatus for positively seating and latching a tape reel on a drive shaft which is rapid and dependable in use and assures accurate alignment between the tape reel and drive shaft.

It is another object of the present invention to provide a reel latching apparatus which is capable of positively seating and latching a tape reel in predetermined relation to a drive shaft wherein the steps of seating and latching the reel in place are fully coordinated and carried out in sequential order in response to movement of a common actuating member; and further wherein the reel can be quickly and easily released for removal from the drive shaft by reverse movement of the actuating member.

It is a still further object of the present invention to provide a novel and improved form of reel latching apparatus of the type disclosed in the patent to Froehlich, No. 3,278,133, and specifically wherein all of the advantages and features of the aforesaid patent are retained while incorporating the additional advantage of positive seating of the reel on a reel hub as a preliminary to outward radial expansion of a mandrel on the hub into firm frictional engagement with the inner surface of the reel.

It is an additional object of the present invention to provide in reel latching apparatus of the type described for locating means to prevent movement of the actuating member to the latching position in the event that the tape reel is not first seated and properly aligned with the latching mechanism.

In accordance with the present invention a reel latching apparatus includes a reel hub which is mounted on a drive shaft and is provided with a seat portion for placement of a tape reel thereon. In a conventional manner, an expansion ring or mandrel on the seat portion is capable of undergoing radial expansion into latching engagement with the inner surface of the tape reel in response to axial movement of a shiftable cam member against the ring. In the present invention, however, a plurality of reel locking or positioning members are situated between the hub and cam member to be responsive to axial advancement of the cam member toward the ring to positively engage one side of the reel and to yieldingly urge the reel against the seat; and preferably a separate element is correlated with movement of the cam member to initiate outward radial extension and axial movement of the reel locking members into engagement with the reel prior to radial expansion of the ring into the latching position. Sequential seating and latching of the reel further enables the use of locating pins or other suitable means to prevent movement of the cam member against the ring if the reel is not properly seated in place on the hub.

The foregoing and other objects, features and advantages of the invention will be apparent from the following more particular description of a preferred embodiment of the invention, as illustrated in the accompanying drawings.

Figure 1:
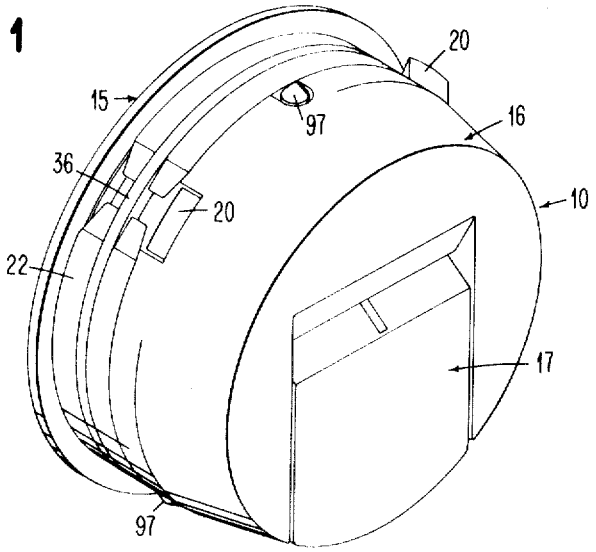
FIG. 1 is a perspective view of a preferred form of the present invention.

Referring in detail to the drawings, the preferred form of reel latching apparatus is mounted at the end of a drive shaft 12 for the purpose of releasably positioning and latching a magnetic tape reel, the inner portion of which is represented at 14, for rotation by the drive shaft. Broadly, the reel latching apparatus 10 is comprised of a reel hub section 15, a shiftable cover 16 with associated cam lever 17, and a plurality of radial slide bolts 20 arranged at equally spaced intervals between the hub 15 and cover 16 which cooperate with an expansion ring 22 on the hub section 15 to effect sequential positioning and latching of the tape reel for rotation with the drive shaft 12.

The hub section 15 includes an annular end plate 24 having an inner sleeve 25 for insertion of a bushing 26. The bushing is permanently affixed within the sleeve portion 25 and in turn is keyed for rotation with the drive shaft 12. A cylindrical wall portion 28 extends axially from the end plate 24 in spaced outer concentric relation to the sleeve 25 and at a point spaced inwardly of the outer peripheral edge of the end plate 15; and a locating flange 30 at the outer peripheral extremity of the end plate 24 defines with the wall portion 28 a seat portion for the reel 14.

Figure 3:
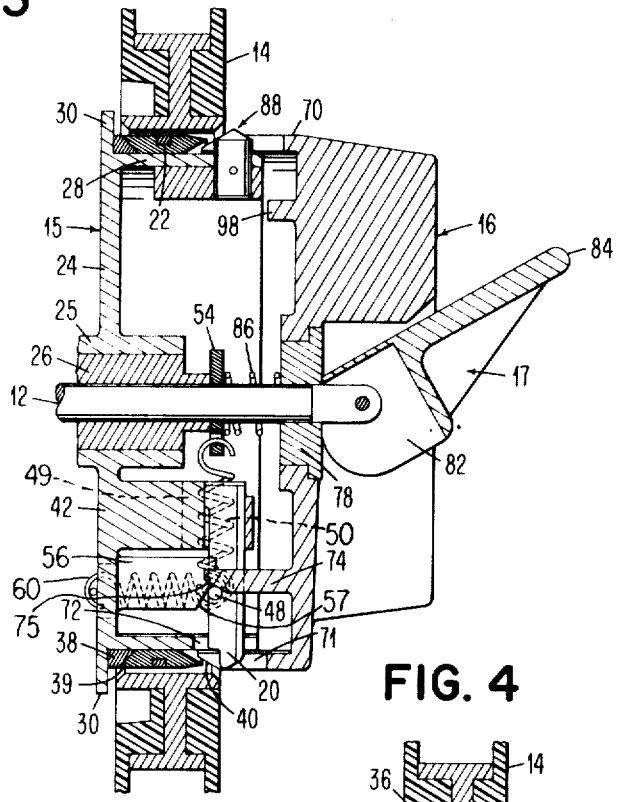
FIG. 3 is an enlarged cross-sectional view in elevation of the preferred form of latching apparatus and showing the latching mechanism in the released position.
Figure 4:
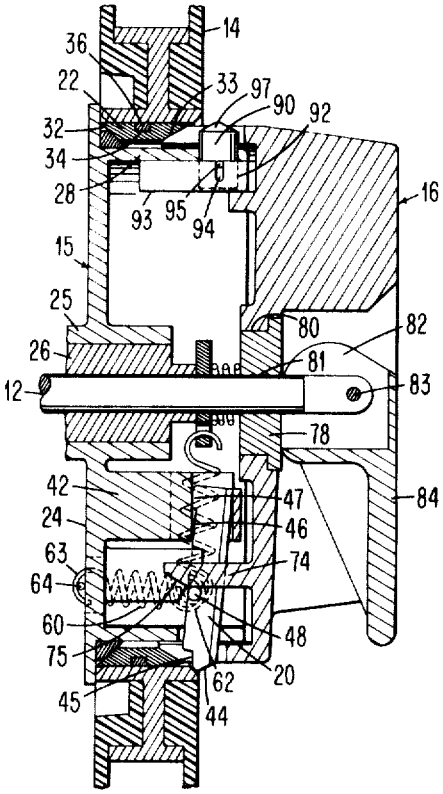
FIG. 4 is an enlarged cross-sectional view in elevation corresponding to FIG. 3 and showing the relative disposition of the parts in the preferred form of apparatus when in the closed or latched position.
Figure 5:
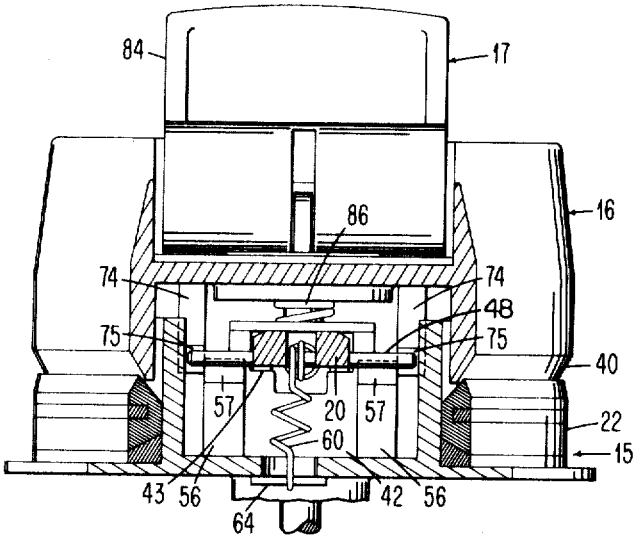
FIG. 5 is a side view partially in section to show a portion of the reel locking mechanism.

The construction and arrangement of the reel hub section 15 herein described, including the outer expansion ring 22, generally corresponds to that disclosed in the aforesaid patent to Froehlich, No. 3,278,133, and reference is made to that patent for the detailed construction of the expansion ring 22 and its specific advantages and features. Essentially, the expansion ring 22 takes the form of a split mandrel having tapered side faces 32 and 33, as best seen from FIGS. 3 and 4, and a circumferential groove or notch 34 in the external surface of the mandrel is sized to receive an endless metal band 36. In order to cause radial expansion of the ring 22 from the position shown in FIG. 3 into the latching position shown in FIG. 4, another wedge-like ring portion 38 is positioned against the locating flange 30 and has a tapered face 39 complementary to the tapered side face 32 of the ring 22. In a similar manner, the shiftable cover 16 is provided with a tapered cam face 40 complementary to the cam face 33 on the expansion ring and which in cooperation with the tapered face 39 will compressively wedge against opposite side faces 32 and 33 to effect outward radial expansion of the mandrel 22 into engagement with the inner surface of the reel as shown in FIG. 4.

Figure 2:
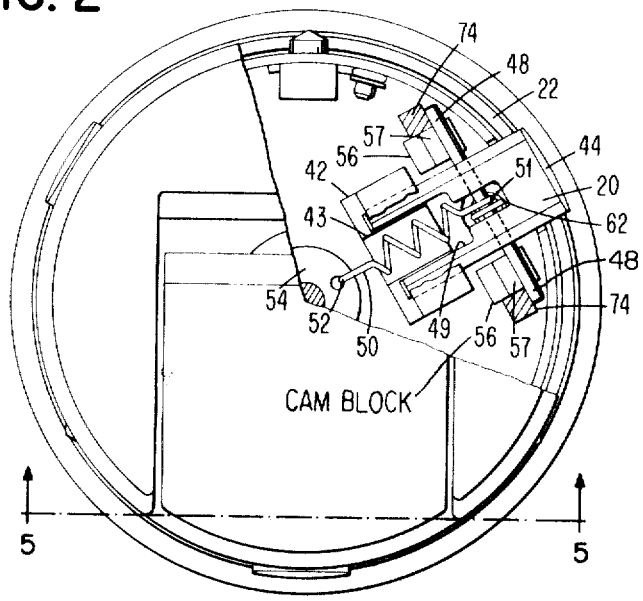
FIG. 2 is a front view with a portion of the cover broken away to show parts of the reel locking mechanism and one of the locating members, in accordance with the present invention.

In accordance with the present invention, the reel hub section is additionally provided with support blocks 42 for each of the three radial side bolts 20, the support blocks extending forwardly from the inner surface of the end plate in the space intermediately of the inner sleeve 25 and outer cylindrical surface 28. Each block is provided with a radially extending aperture 43 to slidably receive one of the slide bolts 20. In turn, each slide bolt 20 has an elongated, generally rectangular shank and is provided with a relatively wide and flat tapered nose portion 44 and at its outer end with a notched undersurface 45 of limited extent. The undersurface 45 of the nose is located outwardly of a shallow, relieved undersurface portion 46 extending along the greater length of the bolt and which terminates in a relatively thick inner end portion 47. As shown in FIG. 2, a pin 48 extends transversely through each of the bolt members 20, and a radial spring 50 is passed through a large open slot 49 in the bolt with its leading end 51 coiled about the pin 48. The opposite end 52 of the spring is anchored to an annular washer 54 which is mounted on the sleeve 25 in surrounding relation to the drive shaft. Located just outwardly of the support block are a pair of cam blocks 56 flanking opposite sides of the bolt 20, and outwardly inclined cam faces 57 on each block are aligned beneath either side of the pin 48. In addition, an axially extending compression spring 60 is provided for each bolt 20 and has one end 62 anchored to the pin 48 and the opposite end 63 extending through a slot in the end plate 24 of the reel hub section and anchored by a pin 64 on the undersurface of the end plate.

The shiftable cover 16 is generally cup-shaped in configuration with a rearwardly divergent cylindrical wall 70 terminating in the circular cam face 40. The side wall of the cover and the cylindrical portion 28 of the reel hub section are provided with oppositely directed, open slots 71 and 72, respectively, for outward radial extension of each of the bolt members 20. In order to initiate outward radial movement of the bolts 20, pairs of cam actuating members 74 are arranged at equally spaced circumferential intervals about the inner surface of the cover for rearward extension into engagement with the pins 48 on the reel locking members. As shown in FIGS. 2 to 4, the members 74 are provided with tapered cam faces 75 and each pair of members 74 is aligned to contact opposite ends of the pin just outwardly of the cam blocks 56. It will be noted that the taper or slope of the cam faces 75 is opposite to and greater than the cam faces 57 on the cam blocks. Thus, in response to rearward shifting of the cover in a direction advancing the cam face 40 toward the expansion ring 22 the cams 74 will overcome the force of the radial springs 50 to urge the pins 48 and associated bolt members 20 in an outward radial direction. Simultaneously, the compressive force of the axial spring 60 will cause the pin members 48 to slide rearwardly along the inclined cam faces 57. As a result, the bolts 20 are each movable from a retracted position shown in FIG. 3 to an extended position as shown in FIG. 4 in which the nose portions 44 are advanced outwardly through the slots 71 and 72 and moved axially, under the cooperative urging of the actuating members 74 and spring 60, into engagement with the side of the reel opposite to the flange 30.

The closed end of the cover has a bearing 78 mounted within a recessed portion 80, and the bearing is provided with a central bore 81 to permit insertion of the drive shaft 12 for connection to the cam lever 17. Here, a thickened end portion 82 of the cam lever 17 is slotted for insertion of the end of the drive shaft and for pivotal interconnection between the lever and drive shaft by pin 83. A relatively broad, flat handle plate 84 forms a continuation of the thickened end portion 82 to facilitate manual grasping of the cam lever for movement from the open position as shown in FIG. 3 to the closed position shown in FIG. 4. In the latter position the handle plate lies within the recessed portion with its outer surface flush with the external surface of the cover. Additionally a return spring 86 is positioned between the washer 54 and the bearing 78 in surrounding relation to the drive shaft and is biased to urge the cover to follow opening movement of the cam lever in releasing the cam face 40 from engagement with the side of the expansion ring 22.

Figure 6:
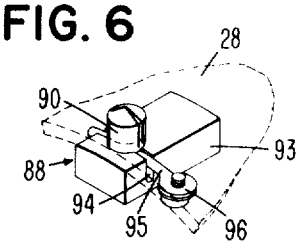
FIG. 6 is a detailed perspective view of one of the locating members forming a part of the preferred form of the present invention.

When the reel locking members are in the retracted position shown in FIG. 3, or in other words, in the open position of the cover, a tape reel 14 may be readily passed over the external surface of the cover and loosely aligned with the expansion ring 22. In order to assure proper location of the reel on the hub section, locating members 88 are arranged for outward radial extension at spaced circumferential intervals around the cover. For example, in the preferred form, a locating member 88 is located alongside each of the bolt assemblies, as shown in FIG. 6 and each member 88 consists of a pin 90 inserted through a bore 92 in a support block 93 mounted on the inner surface of the cylindrical portion 28. Each pin is provided with a transverse bore which is aligned with an open slot 94 in the mounting block for transverse insertion of the flexible arm 95 of the spring element 96, the latter being positioned immediately adjacent to the mounting block on the inner surface of the cylindrical portion 28. The leading end of the pin has a tapered end surface 97 and the reel, in passing over the external surface of the cover, will engage the tapered end surface of the pin forcing it inwardly against the bias of the spring 96. After the reel has cleared the pin, the pin will then return to its original outwardly extended position under the urging of the spring arm 95. However if the reel does not completely clear all of the pins 90 and prevents any one or more of the pins from returning to a normally outward position, the pin will interfere with inward movement of projection 98 on the cover thereby acting as a limit stop and preventing the cover from being advanced to its closed position and thus indicating improper placement of the reel on the reel hub prior to its latching in place.

In practice, the cam lever must be in the open position shown in FIG. 3 to permit mounting of the tape reel on the reel hub sections and, as stated, the locating pins 90 will assure correct initial placement of the reel on the reel hub section rearwardly of the bolts 20 before the cover is shifted to lock the reel in place. Once in place, the lever 17 is forced inwardly by hand toward the position shown in FIG. 4; and under initial movement of the cover, the actuating members 74 will urge the pins 48 along the cam faces 57 and force the slide bolts 20 outwardly in a radial direction through the aligned slots 71 and 72. The axial spring 60 will cooperate in urging the bolts 20 rearwardly along the inclined cam faces 57 and to impart axial movement to the bolts as they are radially advanced by the members 74. Here the nose portion 44 on each of the slide bolts 20 will move into engagement with a chamfered edge on the inner surface of the reel and axially position the reel firmly against the seat portion 30. Axial positioning or seating of the reel is initiated prior to outward radial expansion of the ring 22 so that the reel is axially aligned with the ring 22. Under continued movement of the cover the cam face 40 will engage the tapered side 33 of the ring and urge the ring against the opposite tapered face 39 thereby compressively wedging the ring between the cam faces and urge the ring to expand outwardly into firm latching engagement with the inner surface of the reel. It will be observed that the bolt members 20 continue to yieldingly engage the side of the reel in the latched position, since the pins 48 will have cleared the ends of the cam faces 75, and which movement is resisted only by the yieldable urging of the axial spring 60. Thus a single movement of the handle will impart a coordinated movement to the slide bolts and the latching device on the reel hub to sequentially seat and latch the reel in place. The reel is released for removal from the latching mechanism simply by flipping the handle to the open position, since the return spring 86 will urge the cover forwardly away from the split ring 22 and the radial springs 50 will urge the reel locking members upwardly and inwardly along the cam faces 57 to the normally retracted position shown in FIG. 3. The reel may then be easily withdrawn and removed, and another reel placed on the latching mechanism.

From the foregoing, it will be evident that the latching apparatus of the present invention is capable of positively seating a magnetic tape reel, either alone or in combination with a tape cartridge, on a reel hub as a preliminary to latching of the reel for rotation on the drive shaft. Notably, sequential seating and latching of the reel is accomplished through single movement of the cam lever with coordinated action between the reel locking members and expansion ring to position and latch the reel in place.

While the invention has been particularly shown and described with reference to a preferred embodiment thereof, it will be understood by those skilled in the art that various changes in form and details may be made therein without departing from the spirit of the invention.

What is claimed is:

1. In a reel latching mechanism having a reel hub mounted on a drive shaft, [an] *a radially movable* expansion member associated with said reel hub, and a *first axially movable* cam member movable with respect to the expansion member to cause outward radial movement of the expansion member into latching engagement with the inner surface of a reel when the reel is positioned on said reel hub, the combination therewith of:

reel positioning means including reel engaging members movable to align the reel on said reel hub in outer concentric relation to said expansion member, [and]

*a second axially movable cam member movable with respect to the reel positioning means, and*

*movable* actuating means [coordinated with] *coordinating* movement of said *first and second* cam [member] *members* to initiate outward radial extension and axial advancement of said reel engaging members into engagement with the reel whereby to align the reel in position over said expansion member prior to expansion of said expansion member into latching engagement with the reel.

2. In a reel latching mechanism according to Claim 1, said [actuating] *reel positioning* means including resilient biasing means yieldingly urging each of said reel engaging members axially toward said reel hub.

3. In a reel latching mechanism according to Claim 1, said reel engaging members being defined by radially extending slide bolts interpositioned between said reel hub and said *second* cam member.

4 In a reel latching mechanism according to Claim 3, said [actuating means] *second cam member* including oppositely directed cam surfaces, said slide bolts each including a cam-engaging portion interpositioned between said oppositely directed cam surfaces, the cam surfaces diverging outwardly in a radial direction with one of the cam surfaces movable in response to movement of said [cam member] *actuating means* to urge said slide [bolt] *bolts* in an outward radial direction along the other of the cam surfaces.

5. In a reel latching mechanism for magnetic tape reels and the like having a real hub mounted on a drive shaft including a seat portion for the tape reel and an expansion ring disposed on the seat portion, the combination therewith of:

a plurality of reel positioning members movable to advance the tape reel against said seat portion and into outer concentric relation to said expansion ring, a *first axially* shiftable cam member movable to urge said expansion ring outwardly into latching engagement with the inner surface of the tape reel when the reel is positioned on said seat portion,

*a second axially shiftable cam member movable to urge said reel positioning members into engagement with a side wall of said reel, and*

[said cam member including] *movable* actuating means [coordinated with] *coordinating* movement of said *first and second* cam [member] *members* to initiate simultaneous outward radial extension and axial advancement of said reel positioning members into engagement with the reel whereby to axially advance the reel against said seat portion and into alignment with said expansion ring, [and]

said expansion ring being *thereafter* expanded into latching engagement with the reel in response to [continued] movement of said *first* cam member upon *said* alignment of the reel with said expansion ring.

6. In a reel latching mechanism according to Claim 5, said [cam member] *actuating means* being defined by a cylindrical cover disposed in axially spaced relation to said reel hub and having [an] *said first* outer circular cam [portion] *member* moveable into engagement with said expansion ring in response to axial advancement of the cover toward said reel hub, and said [actuating means being] *second cam member being* spaced inwardly of said circular cam portion for movement into engagement with said reel positioning members as said cover is axially shifted towards said reel hub.

7. In a reel latching mechanism according to Claim 6, said reel positioning members being defined by radially extending slide bolts each provided with a cam engaging portion, and said [actuating means including cam surfaces] *second cam member being* engageable with the one cam engaging portions of said slide bolts to urge each of said slide bolts in an outward radial direction in response to axial shifting of said cover toward said reel hub.

8. In a reel latching mechanism according to claim 7, each of said slide bolts having a radial spring normally urging said slide bolt inwardly to a retracted position within the periphery of said shiftable cover and an axial spring urging said slide bolt in an axial direction toward said reel hub when said bolt is urged outwardly in a radial direction beyond the periphery of said shiftable cover.

9. In a reel latching mechanism according to claim 6, said shiftable cover being slidably mounted on said drive shaft and axially spaced in relation to said reel hub, a cam lever pivotally secured to the end of said drive shaft to control axial sliding movement of said cover toward said reel hub, and locating means limiting axial sliding movement of said cover toward said reel hub when the reel is not aligned with said reel hub.

10. A reel latching apparatus for latching and positioning a magnetic tape reel on a drive shaft comprising a combination:

a reel hub mounted on the drive shaft including an outer reel seat portion having an expansion mandrel disposed thereon and a wedge member engageable with one side of said expansion mandrel, a shiftable cover mounted in axially spaced relation to said reel hub on the drive shaft, said cover having inner and outer cam actuating members in spaced concentric relation to one another, slidable reel positioning members arranged at equally spaced circumferential intervals between said reel hub and cover, said positioning members being movable between a normally retracted position inwardly of said cover and reel hub to permit placement of a tape reel on said hub and an outwardly extended position projecting radially beyond the reel hub, axial biasing means yieldingly urging said positioning members against the side of the tape reel opposite said wedge members whereby to axially position the reel on said seat portion in alignment with the expansion mandrel, and a cam lever movable in a direction forcing said inner and outer cam actuating members toward said reel hub with said inner cam actuating member first urging said reel positioning members in an outward radial direction for axial movement against the reel hub under the urging of said axial biasing means, said cam lever being further and continuously movable in the same direction to advance said outer cam actuating member into wedging engagement with the side of said expansion mandrel opposite the wedge member whereby to cooperate with said wedge member in radially expanding said mandrel into latching engagement with the inner surface of the tape reel.

11. A reel latching apparatus according to claim 10, further characterized by including a support block slidably supporting each of said reel positioning members for radial extension through aligned slots in said reel hub and shiftable cover.

12. A reel latching apparatus according to claim 11, each of said reel positioning members being in the form of a generally rectangular bolt member having a radial spring biasing said bolt member toward the inwardly retracted position.

13. A reel latching apparatus according to claim 11, further including cam blocks on opposite sides of each of said support blocks, said reel positioning members being defined by bolt members of each having transverse projections resting on inclined cam surfaces on said cam blocks, and said inner cam actuating members being provided with inclined cam surfaces engageable with said transverse projections to overcome said radial springs and force said projections outwardly along the cam surfaces on said cam blocks.

14. A reel latching apparatus for latching and positioning a magnetic tape reel on a drive shaft comprising in combination:

a reel hub mounted on the drive shaft including an outer cylindrical seat portion and an expansion mandrel concentrically disposed on said seat portion, a shoulder portion on the seat portion and a wedge member extending forwardly from said shoulder portion for engagement with one side of said expansion mandrel, a shiftable cover mounted in axially spaced relation to said reel hub on the drive shaft having inner and outer concentric cam actuating members facing said reel hub in outer spaced concentric relation to said drive shaft, reel positioning bolts including means supporting each of said bolts for radial extension at equally spaced circumferential intervals between said reel hub and cover, each bolt having a cam-engaging portion thereon engageable with a tapered cam face on said inner cam actuating member, a stationary cam on said reel hub providing a guide surface engageable with said cam-engaging portion for outward radial extension and axial advancement of each bolt against the side of the reel toward the shoulder portion, first biasing means biasing each bolt to a normally retracted position inwardly of said reel hub, and second biasing means urging each of said bolts axially against the reel when said bolts are extended outwardly beyond the periphery of said hub, and a cam lever movable against said cover in a direction forcing said inner and outer cam actuating members toward said reel hub with said inner cam actuating member first urging said bolts along the guide surfaces for axial advancement against said reel hub under the urging of said second biasing means followed by continued axial advancement of said outer cam actuating member into wedging engagement with the side of said expansion mandrel opposite said shoulder portion whereby to cooperate with said shoulder portion in causing said mandrel to be expanded in a radial direction into latching engagement with the inner surface of the reel.

15. A reel latching apparatus according to claim 14, further including a limit stop on said cover, spring-biased locating means normally projecting partially beyond the periphery of said cover adjacent to the side of the reel opposite said shoulder portion, said means being depressed inwardly by the inner surface of the reel when the reel is passed over the cover into position on said reel hub and remaining in the depressed position to engage said limit stop and limit advancement of said cover if the reel is not advanced past said locating means.

(References on following page)

References Cited

The following references, cited by the Examiner, are of record in the patented file of this patent or the original patent.

UNITED STATES PATENTS

| | | | |
|---|---|---|---|
| 1,946,455 | 2/1934 | Paris | 287—52.07 |
| 2,882,078 | 4/1959 | MacDonald | 242—68.3 |
| 2,928,620 | 3/1960 | Starrakis | 242—68.3 |
| 3,053,466 | 9/1962 | Rehkau | 242—68.3 |
| 3,058,686 | 10/1962 | Field | 242—68.3 |
| 3,278,133 | 10/1966 | Froelich | 242—68.3 |

| | | | |
|---|---|---|---|
| 3,307,797 | 3/1967 | McFeaters | 242—68.3 |
| 3,331,563 | 7/1967 | Roecks | 242—68.3 X |
| 3,379,388 | 4/1968 | Gryczelak | 242—68.3 |

FOREIGN PATENTS

| | | | |
|---|---|---|---|
| 1,196,930 | 7/1965 | Germany | 242—68.3 |
| 1,209,840 | 1/1966 | Germany | 242—68.3 |

JOHN W. HUCKERT, Primary Examiner

E. J. McCARTHY, Assistant Examiner

UNITED STATES PATENT OFFICE
CERTIFICATE OF CORRECTION

PATENT NO. : Re 28,296
DATED : January 7, 1975
INVENTOR(S) : T. E. Mallette

It is certified that error appears in the above-identified patent and that said Letters Patent are hereby corrected as shown below:

Sheets 1, 2, and 3 of the drawings, "1974" should read --1975--.

Column 7, line 18, "one" should be deleted.

Column 7, line 38, "a" , third occurrence, should read -- in --.

Column 7, line 58, "members" should read --member--.

Column 8, line 13, "of" should be deleted.

Signed and sealed this 24th day of June 1975.

(SEAL)
Attest:

RUTH C. MASON
Attesting Officer

C. MARSHALL DANN
Commissioner of Patents
and Trademarks